United States Patent [19]

Ng

[11] Patent Number: 5,917,741

[45] Date of Patent: *Jun. 29, 1999

[54] METHOD AND APPARATUS FOR PERFORMING FLOATING-POINT ROUNDING OPERATIONS FOR MULTIPLE PRECISIONS USING INCREMENTERS

[75] Inventor: Kenneth Y. Ng, Saratoga, Calif.

[73] Assignee: Intel Corporation, Santa Clara, Calif.

[ * ] Notice: This patent is subject to a terminal disclaimer.

[21] Appl. No.: 08/697,887

[22] Filed: Aug. 29, 1996

[51] Int. Cl.[6] .................................................. G06F 7/38
[52] U.S. Cl. .............................. 364/748.03; 364/745.02; 364/770
[58] Field of Search ......................... 364/748.01, 748.02, 364/745.02, 748.03, 745.01, 770

[56] References Cited

U.S. PATENT DOCUMENTS

| | | | |
|---|---|---|---|
| 5,109,480 | 4/1992 | Sone et al. ................................. | 345/431 |
| 5,198,993 | 3/1993 | Makakura ................................. | 364/788 |
| 5,228,126 | 7/1993 | Marianetti, II ........................... | 395/162 |
| 5,258,943 | 11/1993 | Gamez et al. ........................... | 364/748.03 |
| 5,301,139 | 4/1994 | Zinger ...................................... | 364/767 |
| 5,424,967 | 6/1995 | Lee .......................................... | 364/745.02 |
| 5,504,698 | 4/1996 | Su ............................................ | 364/768 |
| 5,511,016 | 4/1996 | Béchade ................................... | 364/748.03 |
| 5,635,858 | 6/1997 | Chang et al. ............................ | 364/770 |
| 5,781,464 | 7/1998 | Metha ...................................... | 364/748.01 |

*Primary Examiner*—Emmanuel L. Moise
*Attorney, Agent, or Firm*—Blakely, Sokoloff, Taylor & Zafman

[57] ABSTRACT

An integrated circuit and method for rounding a number in one of a first or second format to produce a rounded result wherein the number is represented by a set of bits. A first incrementer increments a first subset of the set of bits in response to being enabled and a second incrementer coupled to the first incrementer increments a second subset of the set of bits in response to being enabled. Mode selection logic coupled to the first and second incrementers selectively enables one of the first or second incrementers in response to a control signal indicating the format of the number to be rounded, the first incrementer being enabled if the number is in the first format and the second incrementer being enabled if the number is in the second format.

25 Claims, 5 Drawing Sheets

5,917,741

METHOD AND APPARATUS FOR PERFORMING FLOATING-POINT ROUNDING OPERATIONS FOR MULTIPLE PRECISIONS USING INCREMENTERS

BACKGROUND OF THE INVENTION

1. Field of the Invention

The invention relates to the field of integrated circuit devices. Specifically, the invention relates to efficient performance of floating-point rounding operations for multiple number representation formats using incrementers.

2. Description of Related Art

Real numbers are represented in computer systems as floating-point numbers in the form of a digit string including three components: a sign, an exponent indicating the magnitude of the number and a significand or mantissa indicating the value of the fractional portion of the number. Many floating-point numbers cannot be accurately represented using a finite number of digits. The accuracy of a particular representation and the range of numbers that can be represented thus depends on the total number of digits or data bits available for the representation, as well as the portion of the total number of bits which is dedicated to the exponent and that which is dedicated to the mantissa.

In many computer systems, various formats, also referred to as precisions, are provided to represent floating-point numbers. Different precisions vary not only in the total number of bits used to represent a floating-point number, but also in the number of bits or size of the field used to represent each the exponent and the mantissa. The ANSI/IEEE Standard 754—1985 for binary floating-point arithmetic sets forth standard floating-point formats including single, double, and double-extended (also referred to as extended) precisions, which are used in many computer systems. In order to provide the flexibility to represent a wide range of numbers while also providing for varying degrees of accuracy, many computer systems support execution of floating-point operations in multiple precision modes.

Execution of a floating-point operation, such as a floating-point add or floating-point multiply operation, may produce a result for which the mantissa cannot be accurately represented given the mantissa field size allocated for a particular precision. In this case, in order to represent the result in the desired format, the mantissa may need to be rounded before the final result of the floating-point operation is used by the processor.

IEEE Standard 754 sets forth four rounding operations or modes: round up, round down, truncate and round to the nearest even. Different logic is usually provided for each type of rounding operation. For numbers which are to be rounded up, in many computer systems a full adder is used in order to implement a rounding unit which can round mantissas of multiple precisions. Use of a full adder to perform rounding operations for multiple precision modes is inefficient both in terms of the time required to perform rounding operations and the amount of space which must be allocated to the rounding unit. Since the results of many floating-point operations are rounded before being written back or utilized by other operations, the efficiency of the rounding logic can be critical in determining floating-point execution performance. Further, efficient use of space in an integrated circuit is an important consideration in order to minimize both the size and cost of the end product. Thus, it is desirable to have a more efficient rounding unit to improve floating-point execution performance and reduce the amount of space required for rounding logic which is capable of rounding numbers up in accordance with multiple precisions as well as other number representation formats which may be produced by a floating-point operation.

SUMMARY OF THE INVENTION

A method and apparatus for rounding a number in one of a first or second format to produce a rounded result is described wherein the number is represented by a set of bits. An integrated circuit includes a first incrementer that increments a first subset of the set of bits in response to being enabled and a second incrementer coupled to the first incrementer that increments a second subset of the set of bits in response to being enabled. Mode selection logic coupled to the first and second incrementers selectively enables one of the first or second incrementers in response to a control signal indicating the format of the number to be rounded, wherein the first incrementer is enabled if the number is in the first format and the second incrementer is enabled if the number is in the second format.

BRIEF DESCRIPTION OF THE DRAWINGS

The invention will be understood more fully from the detailed description given below and from the accompanying drawings of embodiments of the invention, which, however, should not be taken to limit the invention to the specific embodiments, but are for explanation and understanding only.

DETAILED DESCRIPTION OF THE INVENTION

A method and apparatus providing for efficient performance of floating-point rounding operations for multiple precisions using incrementers is described. In the following description, numerous specific details are set forth such as particular precisions, numbers of bits, approaches to representing floating-point numbers, processor configurations, etc. in order to provide a thorough understanding of the invention. However, it will be appreciated by those skilled in the art that the invention may be practiced without these specific details. In other instances, well-known structures, circuit blocks, interfaces and architectural functions have not been described in detail in order to avoid obscuring the invention.

Overview of the Invention

The present invention provides a method and apparatus for efficient performance of floating-point rounding operations in accordance with multiple precisions using incrementers. A number to be rounded up and a control signal which indicates the precision of the number to be rounded are received by a rounding unit.

The rounding unit of the invention includes multiple incrementers, each of which is configured to increment a predetermined number of bits at predetermined bit locations from a lowest order bit to a highest order bit representing the number to be rounded. The incrementers are coupled such that a carry-out output of an incrementer configured to increment lower order bits is coupled to a carry-in input of an incrementer configured to increment the next highest order group of bits for each of the multiple incrementers in one embodiment.

Precision mode selection logic coupled to the incrementers selectively enables one of the incrementers in response to the indicated precision of the number to be rounded up such that the least significant bit of the number is incremented. Incrementers associated with higher order bits may be enabled if incrementing the least significant bit of the number causes a signal on the carry-out output of the selected incrementer to be asserted. The selected incrementer together with any incrementers associated with higher order bits produce a rounded number at an output of the rounding unit.

Computer System in Accordance with One Embodiment

Figure 1:
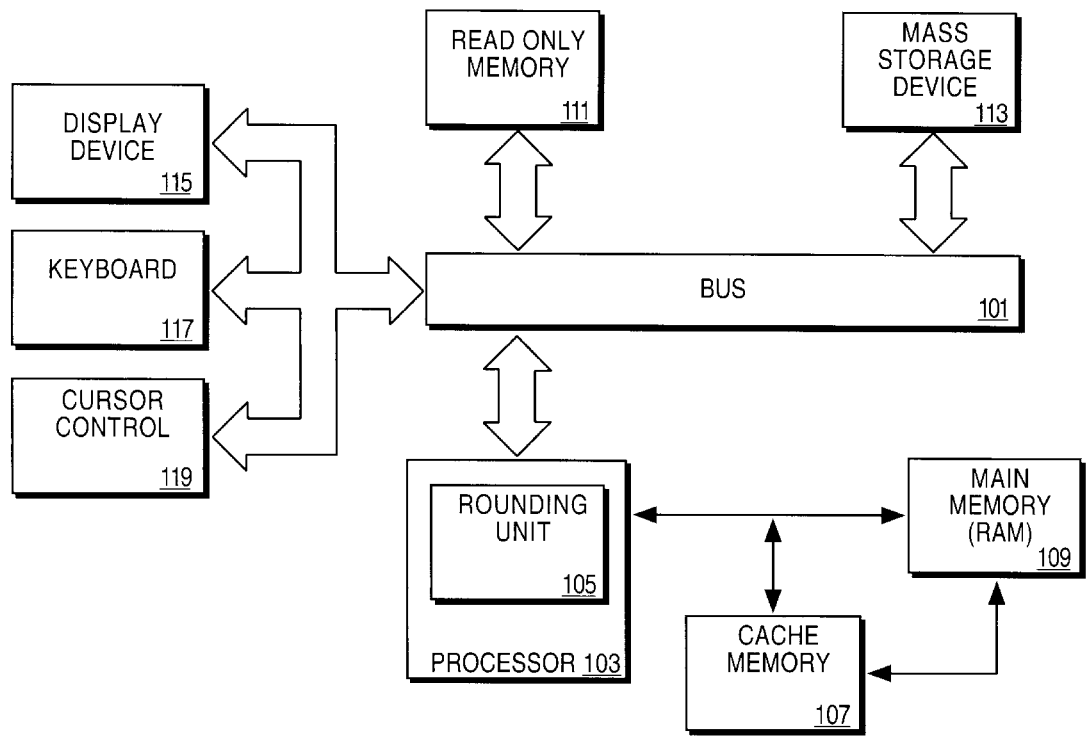
FIG. 1 is a block diagram illustrating a computer system in accordance with one embodiment of the invention.

A block diagram of a computer system in accordance with one embodiment of the invention is illustrated in FIG. 1. The computer system includes a system bus 101 for communicating information and a processor 103 coupled to the system bus 101 for processing information. The processor 103 includes a rounding unit 105 for rounding up certain floating-point numbers and integers which are produced through execution of floating-point operations. The rounding unit 105 of the invention is described below in more detail, particularly with reference to FIG. 4.

A cache memory 107 for storing frequently and/or recently used information for the processor 103, and a main memory 109 including random access memory (RAM) for storing information and instructions for the processor 103, including floating-point instructions, are coupled to the processor 103. A read-only memory (ROM) 111 or other non-volatile storage device for storing fixed information for the processor 103 is coupled to the bus 101. Other components such as a mass storage device 113, a display device 115 such as a printer or monitor, a keyboard 117 or other input device, and a cursor control device 119 may also be included in the computer system.

It will be appreciated by those of skill in the art that a computer system in accordance with the invention may not include all of the components illustrated in FIG. 1 or may include additional components not illustrated in FIG. 1. Further, the rounding unit 105 may be configured on a mathematics co-processor or other processing component in the computer system in alternate embodiments.

Processor in Accordance with One Embodiment

Figure 2:
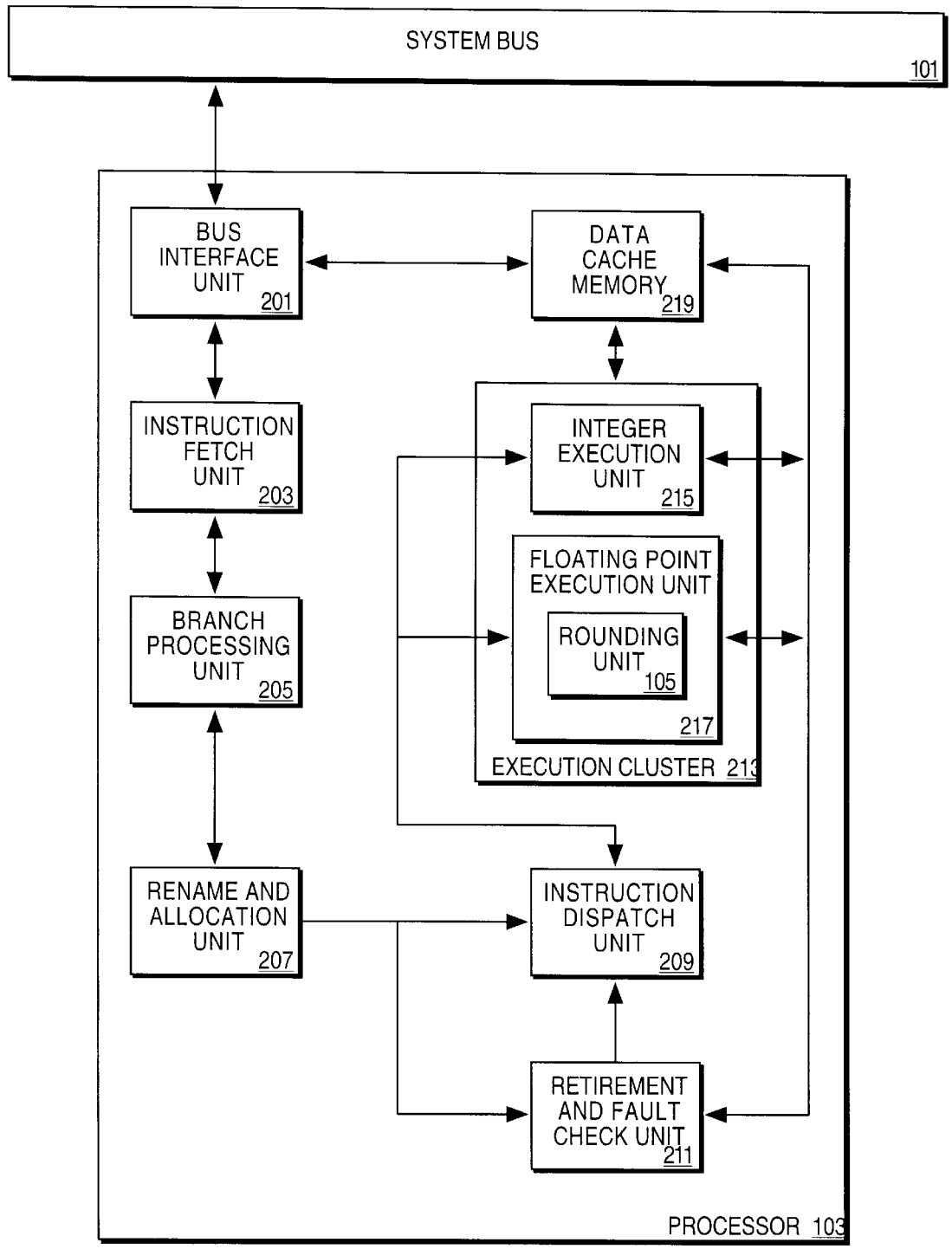
FIG. 2 is a block diagram illustrating a processor in accordance with one embodiment of the invention.

FIG. 2 illustrates a block diagram of the processor 103 in accordance with one embodiment of the invention. The processor 103 includes a bus interface unit 201 that provides the interface between the processor 103 and the system bus 101. An instruction fetch unit 203 that fetches instructions to be processed from a memory is coupled to the bus interface unit 201. The instruction fetch unit 203 of one embodiment includes an instruction cache memory that stores instructions including floating-point instructions and an instruction pointer for indicating an address of an instruction to be fetched from the instruction cache memory or another memory in the computer system. Branch processing unit 205 is coupled to the instruction fetch unit 203 and operates to predict the resolution of conditional branch instructions and assist in other aspects of branch processing.

A rename and allocation unit 207 is coupled to the branch processing unit 205 and operates to allocate resources for processing of instructions which have been fetched by the instruction fetch unit 203. The rename and allocation unit 207 also renames registers where necessary to maintain a speculative architectural state of the processor 103 for instructions which are speculatively processed. An instruction dispatch unit 209 and a retirement and fault check unit 211 are both coupled to the rename and allocation unit 207 and the retirement and fault check unit 211 is coupled to the instruction dispatch unit 209. The instruction dispatch unit 209 dispatches instructions to an execution cluster for processing once any data dependencies have been resolved or the instructions are otherwise ready for processing.

The execution cluster 213 includes multiple execution units for executing different types of operations in accordance with the instructions being processed. The processor 103 of FIG. 2 includes an integer execution unit 215 for executing integer operations and a floating-point (FP) execution unit 217 for executing floating-point operations. The floating-point execution unit 217 includes the rounding unit 105 that operates to round up the results produced by executing floating-point operations where necessary. Further, the execution cluster 213 of one embodiment includes register files (not shown) which indicate the architectural and speculative state of the processor 103. The execution cluster 213 may include other types of execution units for executing other types of operations or multiple execution units of the same type may be included such that multiple operations of the same type may be executed concurrently.

The execution cluster 213 is coupled to both the retirement and fault check unit 211 and a data cache memory 219. Following instruction execution, valid results are written back to the data cache memory 219, and instructions are fault checked and retired in program order by the retirement and fault check unit 211. The data cache memory 219 is also coupled to the bus interface unit 201 such that the data cache memory 219 has access to data stored in other memories outside the processor 103 such as the main memory 109 (shown in FIG. 1).

In other embodiments, the processor may not include all of the functional units illustrated in FIG. 2 or may include other functional units not shown in FIG. 2. For example, the processor may not include a rename and allocation unit in embodiments which do not provide for out-of-order instruction processing. Further, the instruction fetch unit may not include an instruction pointer and may operate in a different manner to fetch instructions for processing.

Before describing the rounding unit 105 in additional detail, it is useful to discuss various precision modes and their representations as supported by one embodiment of the invention. In the embodiment illustrated in and discussed below in reference to FIG. 3, 64 bits are provided for the mantissa representation of a floating-point number. However, the mantissa of a particular floating-point number may be represented using only a subset of the 64 bits available depending on the precision of the particular number.

Figure 3:
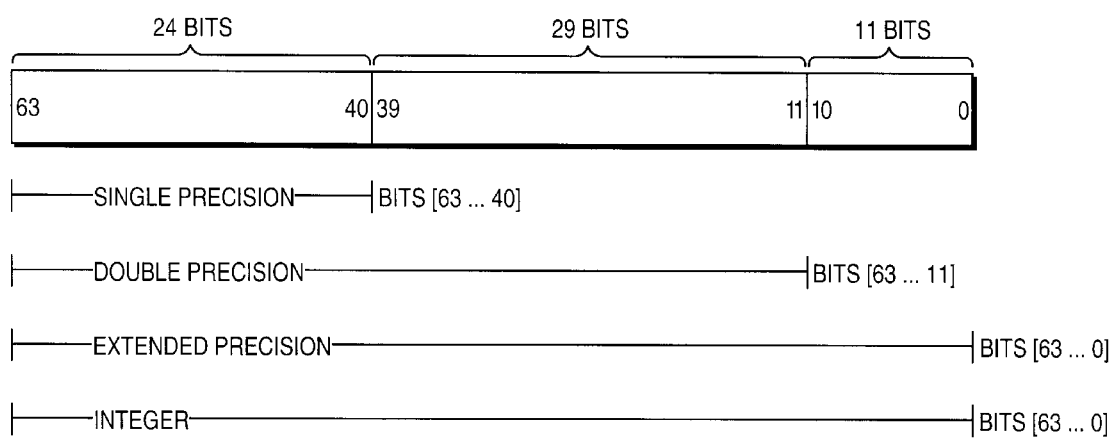
FIG. 3 illustrates the representation of the mantissa for various floating-point precisions with which one embodiment of the invention operates.

FIG. 3 illustrates the number of bits used to represent a mantissa for each floating-point precision mode supported by the floating-point execution unit 217 and the rounding unit 105 of one embodiment, as well as the number of bits used to represent an integer which may be produced by a floating-point-to-integer conversion operation. FIG. 3 also illustrates the position of the bits used in the 64-bit wide field available to represent a mantissa or integer. The lower order bits which are not used in lower precisions are filled with zeroes in one embodiment. In other embodiments, the lower order bits which are not used for a particular precision mode may be filled with ones or otherwise disregarded.

It should be noted that the number of bits for the mantissa or integer of each mode shown in FIG. 3 is the number of bits for the particular mode as used by processing circuitry within the processor 103. In one embodiment, floating-point numbers are stored in a slightly different format than the format in which they are represented when being used by processing circuitry in the processor 103 for particular precisions. For example, when a number is normalized to a standard floating-point format, the mantissa component always begins with a leading "1". In accordance with the IEEE Standard 754, this leading 1 is implied in the representation of single and double precision floating point numbers such that they can be stored using one less bit. When a single or double precision number is later used by processing circuitry, however, this leading 1 is incorporated back into the mantissa representation. Thus, for purposes of producing a rounded number for use by other circuitry in accordance with this embodiment, the processing representation of the mantissa is used rather than the storage representation for single and double precision numbers. For extended precision numbers and integers, the storage and processing representations are the same.

As illustrated, the mantissa of a single precision floating-point number is represented using the 24 most significant bits of the 64-bit wide mantissa field, bits [63..40]. The 53 most significant bits, bits [63..11] are used to represent a mantissa of a double precision number and an extended precision number uses all 64 bits available for the mantissa representation. Integers which have been converted from a floating-point number are also represented using the full 64 bits provided for the mantissa representation of the highest precision mode supported by the processor, which in this example is extended mode.

It should be noted that the exponent representation for a particular number also varies in accordance with the precision of the floating-point number. Because it is the mantissa of a floating-point number which is rounded if rounding is indicated, the exponent representation is not material to the description of the invention and is not discussed in detail herein. Further, it will be appreciated by those of skill in the art that although single, double, and extended precision numbers are discussed to illustrate the capabilities of the invention, other precisions are also within the scope of the invention.

The Floating-point Execution Unit and Rounding Unit

Figure 4:
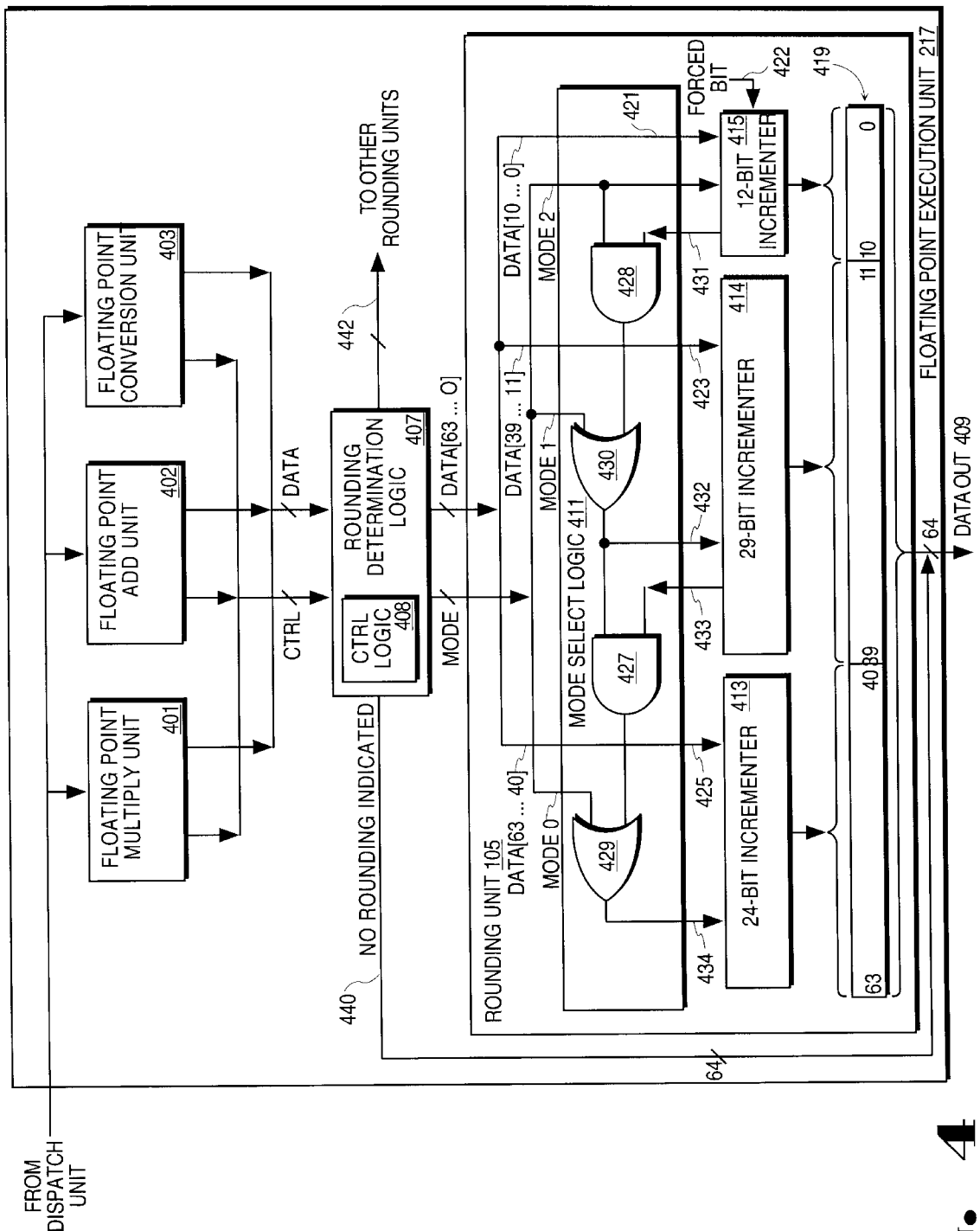
FIG. 4 illustrates a floating-point execution unit including the rounding unit of one embodiment of the invention.

FIG. 4 illustrates the floating-point execution unit 217, and in particular, the rounding unit 105 of one embodiment of the invention in more detail. The floating-point execution unit 217 includes floating-point operation units such as a floating-point multiply unit 401, a floating-point add unit 402 and a floating-point conversion unit 403. The floating-point multiply unit 401 performs floating-point multiplication and division operations, the floating-point add unit 402 performs floating-point addition and subtraction operations, and the floating-point conversion unit 403 converts a floating-point number from one precision to another or from a floating-point number to an integer.

Control and data outputs of each of the floating-point operation units 401–403 are coupled to the rounding unit 105 through rounding determination logic 407. The rounding determination logic 407 determines for a particular result produced by the floating-point add, multiply or conversion units 401–403, whether the result is to be provided directly to an output 409 of the floating-point execution unit 217 or whether the result is to be rounded. If the result will be rounded, the rounding determination logic 407 also determines whether the result will be rounded up by the rounding unit 105 or rounded in another manner by one or more other rounding units which may be provided in the floating-point execution unit 217. The rounding determination logic 407 also includes control logic 408 that generates mode 0, 1 and 2 signals, a particular mode signal being asserted by the control logic 408 in response to the mode of the result to be rounded. The mode of the result to be rounded may be single, double, or extended precision floating-point mode, or integer mode. The operation of the rounding determination logic 407 is described in more detail below.

The rounding unit 105 includes mode select logic 411 and three incrementers 413–415 which operate together to produce a rounded result 419, or more specifically, a rounded mantissa of the result. The mode select logic 411 is configured to receive control signals from the rounding determination logic 407, including the mode 0, 1 and 2 signals responsive to the control signals from the floating-point multiply, add and conversion units 401–403.

The three incrementers 413–415 are coupled to the mode select logic 411 and may be implemented in accordance with any incrementer configuration. Each of the three incrementers 413–415 are configured to receive a subset of the data bits representing the mantissa of the result to be rounded from the floating-point operation units 401–403 through the rounding determination logic 407. A first 12-bit incrementer 415 is configured to receive the 11 lowest order bits—bits [10..0]—of a result mantissa produced by any of the floating-point operation units 401–403 from a data bus at a data input 421. In this embodiment, a 12-bit incrementer is used rather than an 11-bit incrementer in order that the 12-bit incrementer 415 and 24-bit incrementer 413 may share some circuitry thereby saving additional space on the integrated circuit chip. For example, in one embodiment, the incrementers are designed to increment data in 4-bit chunks and thus, circuitry is saved by using a 12-bit incrementer instead of using special additional circuitry to construct an 11-bit incrementer. In this embodiment, a "1," referred to herein as forced bit 422, is input into the lowest order data input bit of the 12-bit incrementer along with the 11 lowest order bits of the mantissa or integer representation. In this manner, when the 12-bit incrementer is enabled, the 11 lowest order bits are incremented in the same manner as if the 12-bit incrementer were an 11-bit incrementer. The least significant bit of the data output from the 12-bit incrementer is then discarded. The forced bit 422 may be generated and discarded using simple control logic well-known to those of skill in the art. In an alternate embodiment, an 11-bit incrementer is used in the same manner as the 12-bit incrementer 415 such that the forced bit 422 is not required.

With continuing reference to FIG. 4, a 29-bit incrementer 414 is configured to receive the 29 next highest order bits—bits [39..11]—of the result mantissa or integer at a data input 423 and a 24-bit incrementer 413 is configured to receive the 24 highest order bits—bits [63..40]—of the result mantissa or integer from the data bus at a data input 425. For lower precision modes, some of the data bits may be zeroes.

In addition to the data inputs, each incrementer 413–415 also includes a carry-in input and/or a carry-out output. A particular incrementer is enabled and operates to increment by one bit the data received by the incrementer if its carry-in input signal is asserted. The incremented data is provided at a data output of each incrementer, or if the incrementer is not enabled, the data is passed unchanged to the incrementer output. Incrementing a section of data which is received by a particular incrementer, for example bits [39..11] by 29-bit incrementer 414, may cause the data to overrun the given portion of the mantissa representation field. In this case, a carry-out output signal of the incrementer 414 performing the incrementing is asserted.

The mode select logic 411 includes AND gates 427 and 428 and OR gates 429 and 430 although other logic configurations are within the scope of the invention. A first input of the AND gate 428 is coupled to receive the mode 2 signal from the rounding determination logic 407 and a second input of the AND gate 428 is coupled to receive the carry-out output 431 of the 12-bit incrementer 415. An output of the AND gate 428 is coupled to a first input of the OR gate 430 which has a second input coupled to receive the mode 1 signal. The output of the OR gate 430 is coupled to the carry-in input 432 of the 29-bit incrementer 414 and to a first input of the AND gate 427. A second input of the AND gate 427 is coupled to receive a signal from the carry-out output 433 of the 29-bit incrementer 414. The output of the AND gate 427 is coupled to a first input of the OR gate 429 which has a second input coupled to receive the mode 0 signal. The output of the OR gate 429 is coupled to the carry-in input 434 of the 24-bit incrementer 413. The carry-out output of the 24-bit incrementer 413 is not shown in FIG. 4, but in one embodiment, indicates an overflow if asserted since a number causing a carry-out signal on the output of the highest order incrementer 413 is too large to represent in the given field.

In accordance with the illustrated configuration, the 12-bit incrementer 415 is enabled to increment data received at its data input 421 if the mode 2 signal is asserted. The 29-bit incrementer 414 is enabled to increment data received at its data input 423 if the mode 1 signal is asserted or if a carry-out signal 431 from the 12-bit incrementer 415 is asserted. Similarly, the 24-bit incrementer 413 is enabled to increment data received at its data input 425 if a mode 0 signal is asserted or if a carry-out signal on carry-out output 433 from the 29-bit incrementer 414 is asserted.

It will be appreciated by one of skill in the art that in addition to the floating-point multiply, add and conversion units 401–403, the floating-point execution unit 217 may include other floating-point operation units which may perform other types of floating-point operations or additional floating-point operations of the same type concurrently. The results produced by the additional floating-point operation units may also be forwarded to the rounding unit 105 for rounding in accordance with a particular format (one of the floating-point precisions or an integer) to produce a rounded result 419.

Operation of the Rounding Unit

The operation of one embodiment of the invention is described with continuing reference to FIG. 4. The floating-point execution unit 217 receives a floating-point instruction from the dispatch unit 209 (FIG. 2) for execution by one of the floating-point multiply, add or conversion units 401–403. The floating-point instruction received from the dispatch unit includes a field which indicates the precision of the result to be produced by executing the instruction. This instruction field determines the mode control signals which are asserted to selectively enable the appropriate incrementer through the mode select logic 411 in order to produce the rounded result 419 in the desired format.

The instruction indicates whether the result will be single, double or extended precision, or whether the result will be an integer. In one embodiment, the precision or mode is indicated using two or more bits with three of the four possible combinations of the two bits indicating different floating-point precision modes and the fourth combination indicating that the number is an integer. It will be appreciated by those of skill in the art that other approaches to indicating the precision of a particular number are within the scope of the invention.

The floating-point operation unit designated by the instruction (one of operation units 401–403), executes the instruction to produce a floating-point result in accordance with the indicated precision or an integer result if the instruction directed a floating-point to integer conversion operation. Each resulting number is then evaluated by the rounding determination logic 407 to determine whether rounding is indicated, and if so, whether the number is to be rounded up. A requirement to round the result may be indicated using any number of approaches. In one embodiment, each resulting number includes three extra bits which are located just below, i.e. to the right of the mantissa field (or left if the order of significance of the bits is reversed) for each precision in accordance with the IEEE 754 floating-point standard. These three bits are referred to as the round bit, the guard bit and the sticky bit. Whether or not a particular number is to be rounded and how it is to be rounded depends on the value of the three bits. Other approaches to indicate rounding are also within the scope of the invention.

Results which are determined not to require rounding are communicated directly to the output 409 of the floating-point execution unit 217 over the bus 440. Results which are to be rounded in a manner other than rounding up are forwarded over the bus 442 to another rounding unit (not shown) such as a rounding unit which truncates or rounds the result down. If the rounding determination logic 407 determines that a particular result is to be rounded up, the result mantissa is forwarded to the rounding unit 105 over a data bus.

The floating-point multiply 401, add 402 or conversion 403 unit which executes a particular floating-point operation produces a data result as well as control signals which indicate the precision of the result. The data output includes sign, exponent and mantissa representations if the result is a floating-point number, although only the mantissa representation is discussed in reference to the rounding operation of the invention. Further, an integer produced through a floating-point to integer conversion operation is represented in the mantissa representation field in one embodiment. Thus, references below to data signals provided to the rounding unit 105 are data signals related to the mantissa field.

In the embodiment described in reference to FIG. 4, bit 63 of the 64-bit wide mantissa or integer representation field is the most significant or highest order bit and bit 0 is the least significant or lowest order bit. Regardless of the precision of a result produced by one of the floating-point operation units 401–403, the 12 lowest order bits (bits [10..0]) of the resulting mantissa field are communicated from the rounding determination logic 407 to the data input 421 of the 12-bit incrementer 415. In the case of lower precision results, these bits may all be zeroes. Similarly, the 29 next highest order bits (bits [39..11]) are communicated from the rounding determination logic 407 to the data input 423 of the 29-bit incrementer 414 and the 24 most significant or highest order bits (bits [63..40] are communicated to the data input 425 of the 24-bit incrementer 413.

In the embodiment illustrated in FIG. 4, if the control signals associated with the result indicate that the result is single precision, the control logic 408 asserts a mode 0 control signal. Asserting the mode 0 signal enables the 24-bit incrementer 413 to increment the 24 most significant bits of the result which are output to the 24 most significant bits of the rounded result 419. The lower order bits are passed through the 29-bit incrementer 414 and the 12-bit incrementer 415 unchanged to the corresponding bits of the rounded result 419. In other words, the output data from each of the incrementers is concatenated to produce the rounded result 419. The rounded result is then provided on the output 409 of the floating-point execution unit 217. In this manner, a single precision rounded result is produced.

If the result is a double precision result as indicated by the control signal outputs from the floating-point operation unit that performed the floating-point operation, the control logic asserts a mode 1 control signal to enable the 29-bit incrementer 414. The 29-bit incrementer 414 increments the 29-bit portion of the result received at its data input 423 and outputs the incremented 29-bit portion of data to the corresponding 29 bits of the rounded result 419. If incrementing the 29-bit portion of the result does not cause a carry-out signal to be asserted by the 29-bit incrementer 414 on carry-out output 433, then the 24 most significant bits of the result are passed through the 24-bit incrementer 413 unchanged to the corresponding bits of the rounded result 419 as are the 11 least significant bits through the 12-bit incrementer 415. If incrementing the 29-bit portion of the result does cause a carry-out signal to be asserted, i.e. the 29-bit portion of the result was all ones prior to incrementing, then the 24-bit incrementer 413 is enabled to increment the 24 most significant bits of the result. The incremented result is output from the 24- and 29-bit incrementers 413 and 414 to the corresponding bits of the rounded result 419 which is then provided to the floating-point execution unit output 409.

Similarly, if the result is an extended precision or integer result, the control logic 408 causes the mode 2 signal to be asserted and the 12-bit incrementer 415 is enabled to increment the 11 least significant bits of the result (and the forced and then discarded bit 422). If the carry-out signal of the 12-bit incrementer 415 is not asserted, the incremented 11 least significant bits are output to the corresponding bits of the rounded result 419 and the most significant 53 bits remain unchanged. If a carry-out signal is asserted, the 29-bit incrementer 414 is enabled as described above. The 24-bit incrementer 413 may also be enabled if there is a carry-out signal from the 29-bit incrementer 414. As above, result data associated with an incrementer which is not enabled to increment the data is passed through unchanged to the corresponding bits of the incrementer data output and concatenated with the outputs of the other incrementers to produce the rounded result 419. The rounded result 419 is then provided on the output 409.

In this manner, the invention operates to produce a rounded result in accordance with multiple modes using incrementers. The invention provides many advantages over existing solutions. By using incrementers instead of a full adder, significant area is saved on the integrated circuit device. Further, a rounding up operation can be performed much faster by the rounding unit of the invention than by rounding units implemented using a full adder. In this manner, the invention provides for more efficient rounding both in terms of utilization of space and rounding speed.

The Method of the Invention

Figure 5:
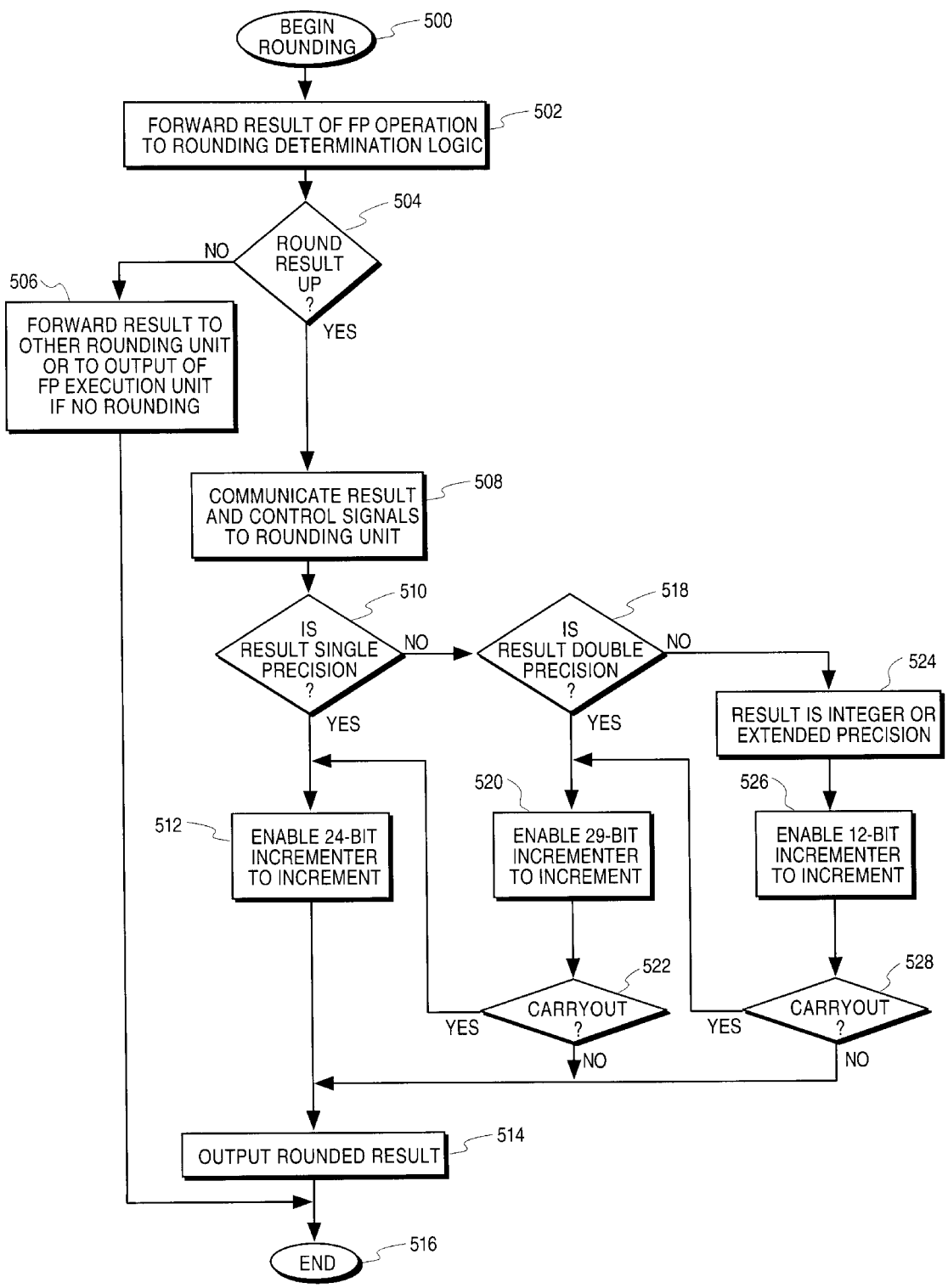
FIG. 5 is a flow diagram illustrating the method of one embodiment of the invention.

The method of one embodiment of the invention is described in reference to FIG. 5 and begins at step 500. In step 502, the result of executing a floating-point operation is forwarded to rounding determination logic 407 to determine whether the result is to be rounded and if so, how the result is to be rounded. At decision block 504, it is determined whether the result is to be rounded up. If not, then in step 506, the result is forwarded to another rounding unit if it is to be rounded in another manner or directly to the output of the floating-point execution unit if no rounding is indicated.

Referring back to decision block 504, if the result is to be rounded up, then in step 508, the result and associated mode control signals are communicated to the rounding unit. At decision block 510, if the result is single precision, then in step 512, a 24-bit incrementer is enabled to increment the least significant bit of the result and a rounded result is produced at step 514. The method of the invention then ends at step 516.

Referring back to decision block 510, if the result is not single precision, then at decision block 518, it is determined whether the result is a double precision number. If so, then in step 520, a 29-bit incrementer is enabled to increment the least significant bit of the result. In step 522, it is determined whether the incrementing step caused a carry-out signal to be asserted (if incrementing the least significant bit of the result caused a carry-out from the 29-bit subset of the result). If not, the rounded result comprises the original 24 most significant bits of the result and the next 29 lower order bits which have been incremented by the 29-bit incrementer. Referring back to decision block 522, if a carry-out signal is asserted, then in step 512, the 24-bit incrementer is enabled and the rounded result is output in step 514.

Referring back to decision block 518, if the result is not a single or double precision result, then in step 524, the result is identified as an integer or an extended precision result. For either an integer or extended precision result, in step 526, a 12-bit incrementer receiving the 11 least significant bits of the 64-bit field provided for a mantissa representation and the forced "1" is enabled and the portion of the result associated with those bits is incremented. The least significant bit is then discarded. In decision block 528, it is determined whether the incrementing step caused a carry-out signal to be asserted. If not, the rounded result is produced in step 514 from the concatenated 11-bit incremented field and the original upper 53 bits of the result. If a carry-out signal is asserted, then in step 520, the 29-bit incrementer is enabled. If there is no carry-out signal from the 29-bit incrementer as evaluated in step 522, then the rounded result is produced in step 514. If there is a carry-out signal, then in step 512, the 24-bit incrementer is also enabled and the rounded result is produced in step 514. The method of the invention ends at step 516.

While the method of the invention has been described in terms of specific precisions and modes, with particular incrementers incrementing a specific number of bits, one of skill in the art will appreciate that the invention may be utilized in accordance with other number formats and modes and different numbers of bits. Further, the invention may be used to perform rounding operations in a processor supporting a larger or smaller number of modes.

Thus, the present invention provides a method and apparatus for efficiently rounding floating-point numbers of multiple precisions using incrementers. Whereas many alterations and modifications of the invention may occur to one of ordinary skill in the art after having read the foregoing description, it is to be understood that the particular embodiments shown and described by way of illustration are in no way intended to be considered limiting. Therefore, references to details of various embodiments are not intended to limit the scope of the claims which in themselves recite only those features regarded as essential to the invention.

I claim:

1. An integrated circuit for rounding a number in one of a first or second format to produce a rounded result, the number being represented by a set of bits, the integrated circuit comprising:
   a first incrementer that increments a first subset of the set of bits in response to being enabled;
   a second incrementer coupled to the first incrementer, the second incrementer to increment a second subset of the set of bits in response to being enabled; and
   mode selection logic coupled to the first and second incrementers, the mode selection logic to selectively enable one of the first or second incrementers in response to a control signal indicating the format of the number to be rounded, the first incrementer being enabled if the number is in the first format and the second incrementer being enabled if the number is in the second format.

2. The integrated circuit of claim 1 further including a third incrementer coupled to the second incrementer, the third incrementer to increment a third subset of the set of bits in response to being enabled, wherein the number is in one of the first, second, or a third format and wherein the mode selection logic is further coupled to the third incrementer to selectively enable the third incrementer if the control signal indicates that the number is in the third format.

3. The integrated circuit of claim 2 wherein the number is in one of the first, second, third, or a fourth format, the mode selection logic to selectively enable the third incrementer if the control signal indicates that the number is in one of the third or fourth formats.

4. The integrated circuit of claim 3 wherein the first format is a single precision floating-point format, the second format is a double precision floating-point format, the third format is an extended precision floating-point format and the fourth format is an integer format.

5. The integrated circuit of claim 2 wherein the set of bits includes 64 bits and wherein the first incrementer is a 24-bit incrementer and the first subset of the set of bits includes 24 bits, the second incrementer is a 29-bit incrementer and the second subset of the set of bits includes 29 bits and the third incrementer is a 12-bit incrementer and the third subset of the set of bits includes 11 bits.

6. The integrated circuit of claim 2 wherein a carry-out output of the third incrementer is coupled to a carry-in input of the second incrementer and a carry-out output of the second incrementer is coupled to a carry-in input of the first incrementer such that the second incrementer is enabled when enabling the third incrementer to increment the third subset of bits causes a carry-out signal from the third incrementer to be asserted and the first incrementer is enabled when enabling the second incrementer to increment the second subset of bits causes a carry-out signal from the second incrementer to be asserted.

7. The integrated circuit of claim 6 wherein the mode selection logic selectively enables one of the first, second or third incrementers by asserting a mode select signal at the carry-in input of one of the first, second or third incrementers.

8. The integrated circuit of claim 1 wherein each of the first and second formats is one of a single precision floating-point format, a double precision floating-point format, an extended precision floating-point format or an integer format.

9. The integrated circuit of claim 1 wherein a carry-out output of the second incrementer is coupled to a carry-in input of the first incrementer such that the first incrementer is enabled when enabling the second incrementer to increment the second subset of bits causes a carry-out signal from the second incrementer to be asserted.

10. A method for rounding a number in one of a first or second format to produce a rounded result, the number being represented by a set of bits, the method comprising the steps of:
    receiving the number to be rounded;
    selectively enabling a first incrementer to increment a first subset of the set of bits if the number is in the first format; and
    selectively enabling a second incrementer to increment a second subset of the set of bits if the number is in the second format.

11. The method of claim 10 wherein the number is in one of the first, second or a third format and wherein the method further includes the step of selectively enabling a third incrementer to increment a third subset of the set of bits if the number is in the third format.

12. The method of claim 10 wherein the number is in one of the first, second, third, or a fourth format and wherein the method further includes a step of selectively enabling a third incrementer to increment a third subset of the set of bits if the number is in one of the third or fourth format.

13. The method of claim 12 wherein the set of bits includes 64 bits and wherein the first incrementer is a 24-bit incrementer and the first subset of the set of bits includes 24 bits, the second incrementer is a 29-bit incrementer and the second subset of the set of bits includes 29 bits and the third incrementer is a 12-bit incrementer and the third subset of the set of bits includes 11 bits.

14. The method of claim 12 wherein the first format is a single precision floating-point format, the second format is a double precision floating-point format, the third format is an extended precision floating-point format and the fourth format is an integer format.

15. The method of claim 12 further including the steps of:
    asserting a carry-out signal from the third incrementer if the step of selectively enabling the third incrementer produces a carry-out from the third subset of the set of bits;
    selectively enabling the second incrementer if the carry-out signal from the third incrementer is asserted;
    asserting a carry-out signal from the second incrementer if the steps of selectively enabling the second incrementer produce a carry-out from the second subset of the set of bits; and
    selectively enabling the first incrementer if the carry-out signal from the second incrementer is asserted.

16. The method of claim 15 further including the steps of:
    providing the first subset of the set of bits to corresponding bits of the rounded result if the first incrementer is not selectively enabled;
    providing the second subset of the set of bits to corresponding bits of the rounded result if the second incrementer is not selectively enabled; and providing the third subset of the set of bits in corresponding bits of the rounded result if the third incrementer is not selectively enabled.

17. The method of claim 16 further including the steps of:

providing the incremented first subset of the set of bits to corresponding bits of the rounded result if the first incrementer is selectively enabled;

providing the incremented second subset of the set of bits to corresponding bits of the rounded result if the second incrementer is selectively enabled; and providing the incremented third subset of the set of bits to corresponding bits of the rounded result if the third incrementer is selectively enabled.

18. The method of claim 10 wherein each of the first and second formats is one of a single precision floating-point format, a double precision floating-point format, an extended precision floating-point format or an integer format.

19. The method of claim 10 further including the steps of:

asserting a carry-out signal from the second incrementer if the step of selectively enabling the second incrementer produces a carry-out from the second subset of the set of bits; and selectively enabling the first incrementer if the carry-out signal from the second incrementer is asserted.

20. A processor comprising:

a floating-point operation unit that performs a floating-point operation in response to a floating-point instruction to produce a result in one of a first or second format; and a rounding unit coupled to the floating-point operation unit that rounds the result to produce a rounded result, the rounding unit including a first incrementer that increments a first subset of the result in response to being enabled, a second incrementer coupled to the first incrementer that increments a second subset of the result in response to being enabled, and mode selection logic coupled to the first and second incrementers that selectively enables one of the first or second incrementers in response to a control signal indicating the format of the number to be rounded, the first incrementer being enabled if the number is in the first format and the second incrementer being enabled if the number is in the second format.

21. The processor of claim 20 wherein the rounding unit further includes a third incrementer coupled to the second incrementer, the third incrementer to increment a third subset of the result in response to being enabled and wherein the mode selection logic selectively enables the third incrementer if the result is in a third format.

22. The processor of claim 21 wherein each of the first, second and third formats is one of a single precision floating-point format, a double precision floating-point format, an extended precision floating-point format or an integer format.

23. A computer system comprising:

a bus that communicates information;

a memory coupled to the bus, the memory to stores a floating-point instruction; and a processor coupled to the bus, the processor to process information, the processor including a floating-point operation unit that performs a floating-point operation in response to the floating-point instruction to produce a result in one of a first or second format, a rounding unit coupled to the floating-point operation unit that rounds the result to produce a rounded result, the rounding unit including a first incrementer that increments a first subset of the result in response to being enabled, a second incrementer coupled to the first incrementer that increments a second subset of the result in response to being enabled, and mode selection logic coupled to the first and second incrementers, the mode selection logic to selectively enable one of the first or second incrementers in response to a control signal indicating the format of the number to be rounded, the first incrementer being enabled if the number is in the first format and the second incrementer being enabled if the number is in the second format.

24. The computer system of claim 23 wherein the rounding unit further includes a third incrementer coupled to the second incrementer, the third incrementer to increment a third subset of the result in response to being enabled and wherein the mode selection logic selectively enables the third incrementer if the result is in a third format.

25. The computer system of claim 24 wherein each of the first, second and third formats is one of a single precision floating-point format, a double precision floating-point format, an extended precision floating-point format or an integer format.

\* \* \* \* \*